United States Patent
Wang et al.

(10) Patent No.: US 12,530,024 B2
(45) Date of Patent: Jan. 20, 2026

(54) YARN SPINDLE QUALITY CONTROL METHOD BASED ON KNOWLEDGE GRAPH, ELECTRONIC DEVICE, AND STORAGE MEDIUM

(71) Applicant: ZHEJIANG HENGYI PETROCHEMICAL CO., LTD., Hangzhou (CN)

(72) Inventors: Peng Wang, Hangzhou (CN); Xiantao Peng, Hangzhou (CN); Junliang Jin, Hangzhou (CN); Zhangzhong Cheng, Hangzhou (CN); Yanjun Jiang, Hangzhou (CN); Jifei Chen, Hangzhou (CN)

(73) Assignee: ZHEJIANG HENGYI PETROCHEMICAL CO., LTD., Hangzhou (CN)

( * ) Notice: Subject to any disclaimer, the term of this patent is extended or adjusted under 35 U.S.C. 154(b) by 0 days.

(21) Appl. No.: 18/434,895

(22) Filed: Feb. 7, 2024

(65) Prior Publication Data

US 2025/0060740 A1 Feb. 20, 2025

Related U.S. Application Data

(63) Continuation of application No. 18/389,864, filed on Dec. 20, 2023, now abandoned.

(30) Foreign Application Priority Data

Aug. 17, 2023 (CN) .......................... 202311041367.3

(51) Int. Cl.
G05B 23/02 (2006.01)
(52) U.S. Cl.
CPC ..... *G05B 23/0283* (2013.01); *G05B 23/0243* (2013.01); *G05B 23/0275* (2013.01)

(58) Field of Classification Search
CPC .................................................. G05B 23/0283
See application file for complete search history.

(56) References Cited

U.S. PATENT DOCUMENTS

| | | | | | |
|---|---|---|---|---|---|
| 5,124,928 A | * | 6/1992 | Aemmer | ................ | B65H 63/00 73/160 |
| 6,434,262 B2 | * | 8/2002 | Wang | .................... | G06T 7/0012 382/274 |

(Continued)

FOREIGN PATENT DOCUMENTS

| | | |
|---|---|---|
| CN | 110491106 A | 11/2019 |
| CN | 110969231 A | 4/2020 |

(Continued)

OTHER PUBLICATIONS

The State Intellectual Property Office of People's Republic of China; First Office Action; Chinese Application No. 202311041367. 3; 17 pages; dated Apr. 18, 2025.

*Primary Examiner* — Hyun D Park
(74) *Attorney, Agent, or Firm* — Faegre Drinker Biddle Reath LLP

(57) ABSTRACT

Provided is a yarn spindle quality control method based on a knowledge graph, an electronic device, and a storage medium. The method includes determining whether there is an abnormal parameter in a production parameter and/or a process parameter of a group of yarn spindles based on a quality inspection result, the production parameter and the process parameter of the group of yarn spindles; searching an adjustment manner corresponding to the production parameter and/or the process parameter from a knowledge graph for yarn spindle production and management, in a case where there is the abnormal parameter; and sending the adjustment manner corresponding to the production parameter and/or the process parameter to a related device of the group of yarn spindles.

17 Claims, 7 Drawing Sheets

(56) References Cited

U.S. PATENT DOCUMENTS

| | | | | |
|---|---|---|---|---|
| 6,969,553 B1* | 11/2005 | Tam | ........................ | D01F 6/04 |
| | | | | 428/394 |
| 2013/0023610 A1* | 1/2013 | Kikuchi | ................ | D01F 1/106 |
| | | | | 524/359 |
| 2015/0129078 A1* | 5/2015 | Yun | ........................ | A43B 1/04 |
| | | | | 139/421 |
| 2021/0342705 A1* | 11/2021 | von Grünigen | .... | G05B 23/0281 |
| 2022/0163947 A1 | 5/2022 | Michan | | |

FOREIGN PATENT DOCUMENTS

| | | | |
|---|---|---|---|
| CN | 112540832 | A | 3/2021 |
| CN | 113129305 | A | 7/2021 |
| CN | 113590835 | A | 11/2021 |
| CN | 114430365 | A | 5/2022 |
| ES | 542250 | | 6/1986 |

* cited by examiner

| | |
|---|---|
| Frame <Device knowledge framework> | |
| Slot name | Slot value |
| Device name | Reactor |
| | Spinning box |
| | Winding machine |
| | ... |
| Channel and production line where device is located | WDC 1 |
| | WDC 2 |
| | ... |
| Location of device on the production line | 01 |
| | 02 |
| | 12 |
| | 24 |
| | ... |

FIG. 9

Frame <Process parameter knowledge framework>

| Slot name | Slot value |
|---|---|
| Spinning speed | 2710M/min-2715M/min<br>2700M/min-2705M/min<br>4100M/min-4105M/min<br>4400M/min-4405M/min<br>4600M/min-4605M/min<br>... |
| Fineness center value | 167±2.5%<br>261±2.5%<br>... |
| Tension | 10cN<br>14cN<br>18cN<br>... |
| Hot roller temperature | 92°C-96°C<br>141°C-145°C<br>... |

YARN SPINDLE QUALITY CONTROL METHOD BASED ON KNOWLEDGE GRAPH, ELECTRONIC DEVICE, AND STORAGE MEDIUM

CROSS-REFERENCE TO RELATED APPLICATIONS

The present application is a Continuation application of U.S. application Ser. No. 18/389,864 filed Dec. 20, 2023, which claims priority to Chinese Patent Application No. CN202311041367.3, filed with the China National Intellectual Property Administration on Aug. 17, 2023, the disclosure of which is hereby incorporated herein by reference in its entirety.

TECHNICAL FIELD

The present disclosure relates to the field of computer technology, especially, to the field of industrial control, and specifically discloses yarn spindle quality control method and apparatus based on a knowledge graph, and a device.

BACKGROUND

In the field of chemical fiber, it is necessary to inspect quality of chemical fiber products. If product quality is found to be unqualified, it may be necessary to manually adjust a production process of the chemical fiber. However, even if the product quality is founded to be unqualified, it is difficult to determine how to adjust the production process due to a long production process, complex processes, and multiple factors affecting the product quality. Therefore, it requires a significant amount of manpower and time to find and solve problems in the production process.

SUMMARY

The present disclosure provides yarn spindle quality control method and apparatus based on a knowledge graph, a device and a storage medium.

A first aspect, the present disclosure provides a yarn spindle quality control method, including: determining whether there is an abnormal parameter in a production parameter and/or a process parameter of a group of yarn spindles based on a quality inspection result, the production parameter and the process parameter of the group of yarn spindles; searching an adjustment manner corresponding to the production parameter and/or the process parameter from a knowledge graph for yarn spindle production and management, in a case where there is the abnormal parameter; and sending the adjustment manner corresponding to the production parameter and/or the process parameter to a related device of the group of yarn spindles.

A second aspect, the present disclosure provides a yarn spindle quality control apparatus, including a determination module configured to determine whether there is an abnormal parameter in a production parameter and/or a process parameter of a group of yarn spindles based on a quality inspection result, the production parameter and the process parameter of the group of yarn spindles; a search module configured to search an adjustment manner corresponding to the production parameter and/or the process parameter from the knowledge graph for yarn spindle production and management, in a case where there is the abnormal parameter; and a sending module configured to send the adjustment manner corresponding to the production parameter and/or the process parameter to a related device of the group of yarn spindles.

A third aspect, provided is an electronic device, including: at least one processor; and a memory connected in communication with the at least one processor. The memory stores an instruction executable by the at least one processor, and the instruction, when executed by the at least one processor, enables the at least one processor to execute the method of any embodiment of the present disclosure.

A Fourth aspect, provided is a non-transitory computer-readable storage medium storing a computer instruction thereon, and the computer instruction is used to cause a computer to execute the method of any embodiment of the present disclosure.

According to the present disclosure, an appropriate adjustment manner corresponding to the production parameter and/or the process parameter may be obtained based on the knowledge graph, in the case where it is determined that there is the abnormal parameter based on the quality inspection result, the production parameter, and the process parameter of the yarn spindles, thereby optimizing a production process of the yarn spindles and obtaining yarn spindle products with better quality.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, same or similar components or elements are represented by reference numerals throughout the accompanying drawings, unless otherwise specified. The accompanying drawings may not necessarily be drawn to scale. It should be understood that the accompanying drawings only depict some embodiments provided according to the present disclosure and should not be considered as limiting the scope of the present disclosure.

FIG. 9 is a schematic diagram of a device knowledge framework according to an embodiment of the present disclosure;

DETAILED DESCRIPTION

Figure 1:
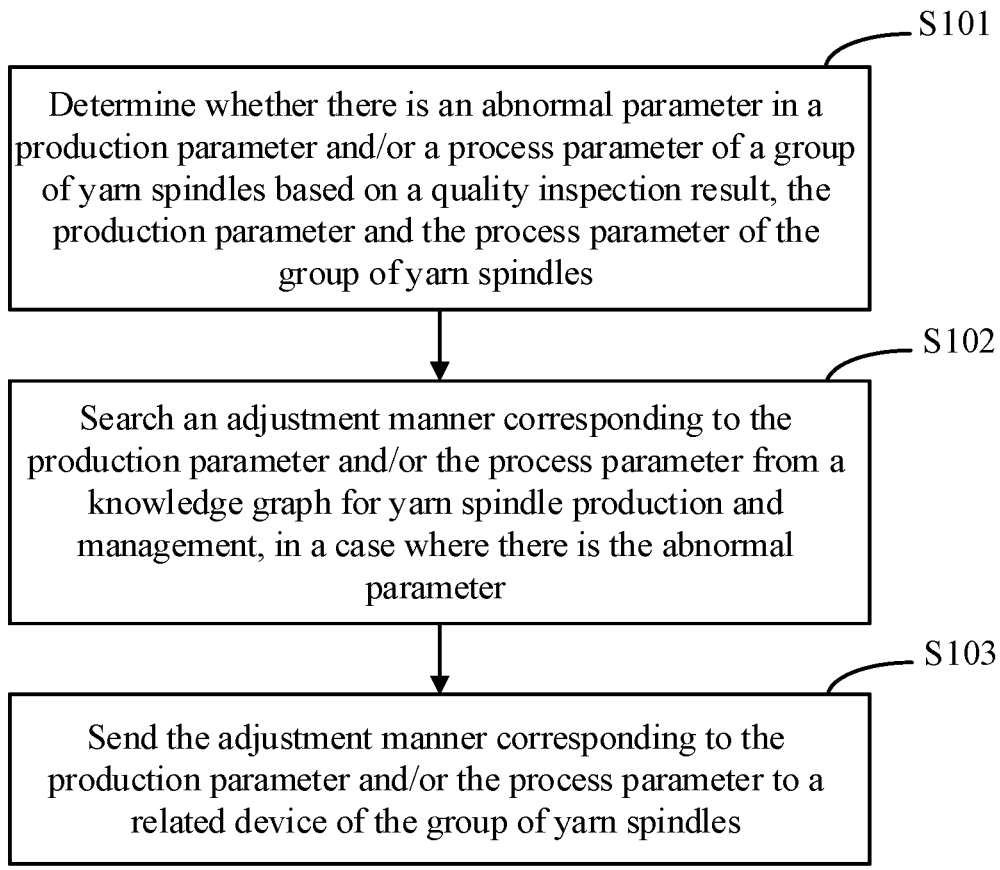
FIG. 1 is a schematic flowchart of a yarn spindle quality control method based on a knowledge graph according to an embodiment of the present disclosure.

The present disclosure will be further described in detail below with reference to the accompanying drawings. Same reference numerals in the accompanying drawings indicate elements with same or similar functions. Although various aspects of the embodiments are shown in the accompanying drawings, it is not necessary to draw the accompanying drawings to scale, unless otherwise specified.

In addition, in order to better illustrate the present disclosure, numerous specific details are provided in the detailed description below. Those having ordinary skill in the art should understand that the present disclosure may also be implemented without the specific details. In some examples, no detailed descriptions are provided for methods, means, components, and circuits that are familiar to those having ordinary skill in the art, in order to highlight the main purpose of the present disclosure.

FIG. 1 is a schematic flowchart of a yarn spindle quality control method based on a knowledge graph based on an embodiment of the present disclosure.

In step S101, whether there is an abnormal parameter in a production parameter and/or a process parameter of a group of yarn spindles is determined based on a quality inspection result, the production parameter and the process parameter of the group of yarn spindles.

In step S102, an adjustment manner corresponding to the production parameter and/or the process parameter is searched from a knowledge graph for yarn spindle production and management, in a case where there is the abnormal parameter.

In step S103, the adjustment manner corresponding to the production parameter and/or the process parameter is sent to a related device of the group of yarn spindles.

In the embodiment of the present application, the group of yarn spindles may include a plurality of yarn spindles with a same batch number, or include a plurality of yarn spindles with different batch numbers. The yarn spindles with the same batch number usually have same parameters. For example, the same parameters of the yarn spindles with the same batch number may include fineness center value, metering pump specification, metering pump speed, oiling rate, oil concentration, spinneret diameter, spinneret aspect ratio, component pressure, winding speed, winding overfeed, network pressure, wind pressure, wind speed and the like.

In the embodiment of the present application, the quality inspection result of the yarn spindles may include results obtained by using various detection devices to detect the yarn spindles, for example, a Raman spectrum graph of chemical fibers obtained by inspecting the chemical fibers of the yarn spindles by using a Raman spectrum device, for another example, photos of the chemical fibers of the yarn spindles obtained by using a scanning electron microscope. The quality inspection result may also include a dye free color judgment result, an appearance detection result, a physical and mechanical performance detection result obtained by analyzing detection results such as the Raman spectrum graph of the chemical fibers and the photos of the chemical fibers.

For example, the dye free color judgment result may include a prediction result on dyeing uniformity of the yarn spindles obtained based on a result such as spectral detection and the like before spinning and dyeing the yarn spindles. The use of the dye free color judgment result may reduce textile costs and waste of dyes, and improve detection efficiency.

For another example, the appearance detection result may include detection and analysis on images such as photos of the chemical fibers and the like manually or through a model, to determine whether an appearance of the yarn spindles meets a production standard, such as whether there is a broken filament, a spider web filament, an oil stain, or a paper tube damage.

For another example, the physical and mechanical performance detection result may include a result obtained by detecting physical and mechanical properties of the yarn spindles, such as yarn density deviation rate, thread density variation coefficient, fracture strength, fracture elongation, and drying unevenness CV.

In an implementation, the production parameter includes at least one of a line type, a machine number, a specification, a batch number, a doff number, or doff time.

In an implementation, the quality inspection result includes at least one of dye free color judgment spectrum information, a dye free color judgment abnormal result, the appearance detection result, or the physical and mechanical performance detection result.

In an implementation, the process parameter includes at least one of tension, spinning speed, an oil content, an oil type, an oiling rate, hot roller temperature, a fineness center value, a metering pump specification, metering pump speed, a spinneret diameter, a spinneret aspect ratio, a full tube weight, or network pressure.

In the embodiment of the present application, in the production parameter, the line type and the machine number may represent a production device of a yarn spindle. The line type may represent a production line of the yarn spindle, and the machine number may represent a serial number of a device used to produce the yarn spindle in the production line. The specification may be represented by characters or numbers, and the specification may correspond to product type, material, size, weight, and the like of the yarn spindle. The doff number may also be referred to as a serial number of doffing, which may indicate an order in which the yarn spindle fall onto a tube. The doff time may represent actual doff time of a yarn spindle product on the production device, such as a winding machine. For example, a yarn spindle with a batch number "XB080516" corresponds to a winding machine with a line type and a machine number "WDC 2-04", a location of which is a fourth winding machine in a "WDC" channel and on line 2. The specification of the yarn spindle is "55/36", the doff number of the yarn spindle is "2", and the doff time of the yarn spindle is "2023/06/05 13:26:55".

In the embodiment of the present application, the process parameter of the yarn spindle may be obtained based on actual processes used in a production process of the yarn spindle. For example, in the process parameter, the fineness center value may represent fineness of a filament with a batch number, and range of positive and negative deviations for filaments of different DPFs (Denier Per Filament) varies, such as 167±2.5%. The tension may represent an amount of the tension applied to yarn filaments during the production process. The winding overfeed may represent a ratio of a difference between winding roller and vehicle speed, which may directly affect a size of a package. A calculation manner may be (winding speed−vehicle speed)÷vehicle speed× 100%. The spinning speed may also include the winding speed, which is related to rotation speed of a filament drawing roller. During winding, speed of a fiber sprayed from a spinneret of a spinning box is generally consistent with the spinning speed, for example, the spinning speed may be 2710 M/min-2715 M/min. The oil content may represent a weight proportion of oil in overall quality of the filament. The hot roller temperature may represent temperature of a hot roller used to heat a chemical fiber. For example, pre heated hot roller temperature may be 94±2° C., and main heated hot roller temperature may be 143±2° C.

In the embodiment of the present application, the production parameter and/or the process parameter of one or more yarn spindles may be recorded in a server such as a single spindle data stream system, a yarn spindle lifecycle system, or the like. The production parameter and/or the process parameter of different yarn spindles may be different, and the production parameter and/or process parameter of a plurality of yarn spindles may also be the same. The batch number of the yarn spindles may be used to query from the server to obtain the production parameter and/or the process parameter of the yarn spindles of the same batch number.

In the embodiment of the present application, by using an abnormality detection model or the knowledge graph, it is possible to determine whether there is the abnormal parameter in the production parameter and/or the process parameter of the group of yarn spindles based on the quality inspection result, the production parameter, and the process parameter of the group of yarn spindles. The abnormality detection model or the knowledge graph may include a normal parameter range. If a certain production parameter and/or a certain process parameter is within the normal parameter range, it indicates that the production parameter and/or the process parameter is a normal parameter. If a certain production parameter and/or a certain process parameter is not within the normal parameter range, it indicates that the production parameter and/or the process parameter is the abnormal parameter.

In the embodiment of the present application, the abnormal parameter may include a production parameter abnormality, a process parameter abnormality, and the like. For example, if the hot roller temperature in the process parameter of the yarn spindle is abnormal, corresponding device information may be searched in the knowledge graph based on a machine to which a hot roller whose temperature is abnormal belongs, in order to determine a cause of the abnormal temperature of the hot roller in the machine, such as temperature sensor failure, hot roller heating rod fault, circuit abnormality, controller failure, or the like. For example, if a "hot roller heating rod fault" is identified, a cause and a corresponding solution of the "hot roller heating rod fault" are searched in the knowledge graph, and search results are sorted and displayed by frequency or time.

In the embodiment of the present application, the process parameter abnormality includes a tension abnormality, a spinning speed abnormality, an oil content abnormality, and a hot roller temperature abnormality. For example, if the oil content in the process parameter of the yarn spindle is abnormal, a normal range of the oil content may be searched from the knowledge graph. Based on the normal range of the oil content, an adjustment manner for the oil content of the production device of the yarn spindle (e.g., which is determined based on a parameter such as the machine number of the yarn spindle) is provided. For another example, if the spinning speed in the process parameter of the yarn spindle is abnormal, a normal range of the spinning speed is searched from the knowledge graph and may be displayed, and an adjustment manner of the spinning speed is also provided.

In an implementation, the related device of the group of yarn spindles includes at least one of a production device, a terminal device or a control device.

In the embodiment of the present application, the adjustment manner may be sent to the related device of the group of yarn spindles, the related device may display the adjustment manner or perform automatically adjustment based on the corresponding adjustment manner, after receiving the adjustment manner. The adjustment manner may include a fault reason, a solution, a repair suggestion, and the like.

For example, the adjustment manner may be sent to the production device corresponding to the group of yarn spindles, such as a reaction kettle, a spinning box, or a winding machine. The fault reason, the solution, the repair suggestion and the like may be displayed on the production device, and certain parameters in the production device may also be automatically adjusted.

For example, when the abnormal parameter is "Fault of Device A", a reason and a solution for "Fault of Device A" are sent to a terminal device, such as, a Personal Digital Assistant (PDA), of a maintenance person, and the reason and the solution are displayed on the PDA for providing the repair suggestion.

For example, if there is a control device for controlling operations of a plurality of production devices, such as Data Center Interconnect (DCI), in a production workshop, it is also possible to send the adjustment manner corresponding to the production parameter and/or the process parameter of the group of yarn spindles to the control device, an adjustment is made by the control device to a device and/or a process designed by the production parameter and/or the process parameter that needs to be adjusted.

According to the embodiment of the present disclosure, an appropriate adjustment manner corresponding to the production parameter and/or the process parameter may be obtained based on the knowledge graph, in a case where it is determined that there is the abnormal parameter by the quality inspection result, the production parameter, and the process parameter of the yarn spindles, thereby optimizing the production process of the yarn spindles and obtaining the yarn spindle product of better quality. For example, in a case where it is determined that the oil content is abnormal, the line type and the machine number of the production device corresponding to the yarn spindle are obtained based on the knowledge graph, and the normal range of the oil content and the adjustment method are obtained, thus it is convenient for the maintenance person to efficiently and quickly solve problems in the production process based on the line type and the machine number of the production device and the normal range of the oil content, in combination of the adjustment manner displayed on a control interface of a related device such as a spinning box.

Figure 2:
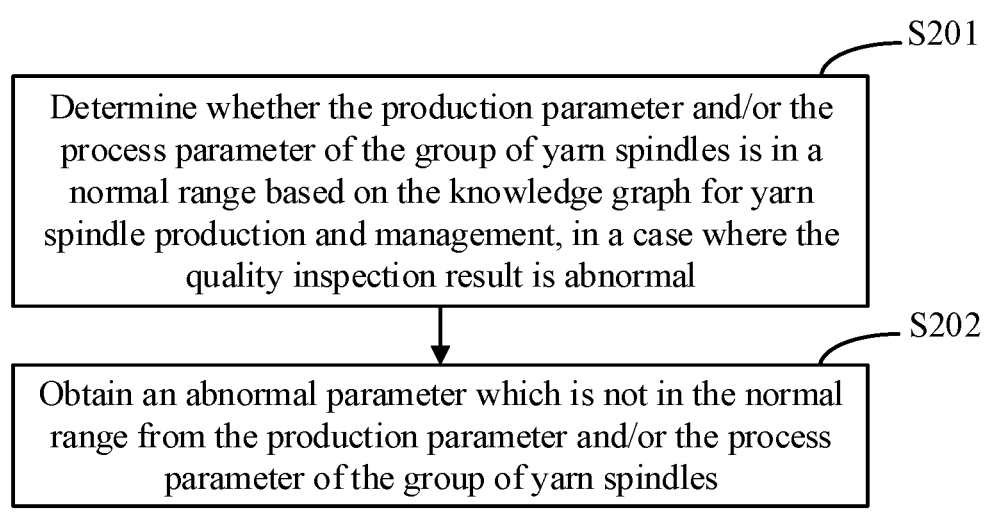
FIG. 2 is a schematic flowchart of a yarn spindle quality control method based on a knowledge graph according to another embodiment of the present disclosure.

FIG. 2 is a schematic flowchart of a yarn spindle quality control method based on a knowledge graph according to another embodiment of the present disclosure. The method may include one or more features of the above yarn spindle quality control method based on the knowledge graph. In an implementation, the group of yarn spindles include a group of yarn spindles with the same batch number, the step S101, that is, determining whether there is the abnormal parameter in the production parameter and/or the process parameter of the group of yarn spindles based on the quality inspection result, the production parameter and the process parameter of the group of yarn spindles, includes the following steps.

In step S201, whether the production parameter and/or the process parameter of the group of yarn spindles is in a normal range is determined based on the knowledge graph for yarn spindle production and management, in a case where the quality inspection result is abnormal.

In step S202, an abnormal parameter which is not in the normal range is obtained from the production parameter and/or the process parameter of the group of yarn spindles.

In the embodiment of the present disclosure, whether the quality inspection result is abnormal may be determined based on the abnormality detection model. When the quality inspection result is abnormal, the step of determining the abnormal parameter is performed, and whether the production parameter and/or the process parameter of the yarn spindles is in a normal range of the batch number corresponding to the yarn spindles is determined based on the knowledge graph for yarn spindle production and management. If the production parameter and/or the process parameter of the yarn spindles is not in the normal range of the batch number corresponding to the yarn spindles, the production parameter and/or the process parameter out of the normal range is obtained.

In the embodiment of the present disclosure, when the quality inspection result is abnormal, the step of determining the abnormal parameter will not be performed if it is determined that the production parameter and/or the process parameter of the yarn spindles is not in the normal range of the batch number corresponding to the yarn spindles based on the knowledge graph for yarn spindle production and management. Due to many uncontrollable factors in a production process for the chemical fiber and an impact of an environment on quality of a final product, when the quality inspection result is abnormal, the production parameter and/or the process parameter may not necessarily have an abnormality. For example, the abnormality in the inspection result is caused by factors other than production and process. In the above case, the production parameter and/or the process parameter may not be adjusted.

According to the embodiment of the present disclosure, by further verifying the production parameter and/or the process parameter when the quality inspection result is abnormal, obtaining the abnormal parameter in the production parameter and/or the process parameter may improve inspection efficiency of the abnormal parameter, reduce a number of inspections, and improve inspection speed. Furthermore, when the quality inspection result is normal, further inspection of the abnormal parameter may be avoided, thereby avoiding frequent adjustments to the production parameter and/or the process parameter, increasing stability of the production process, and ensuring consistency of product quality.

Figure 3:
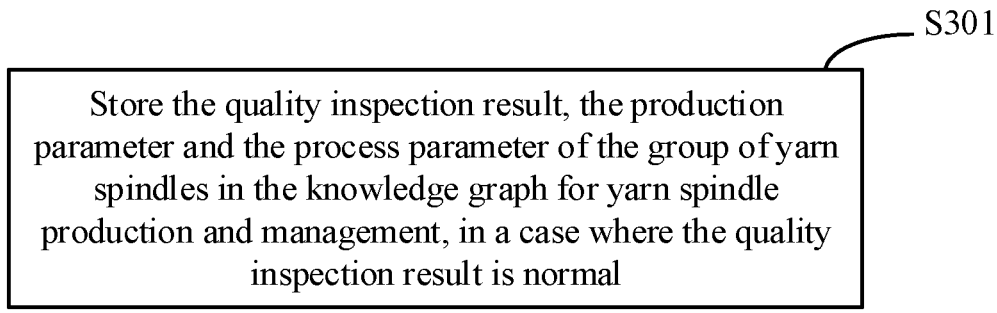
FIG. 3 is a schematic flowchart of a yarn spindle quality control method based on a knowledge graph according to another embodiment of the present disclosure.

FIG. 3 is a schematic flowchart of a yarn spindle quality control method based on a knowledge graph according to another embodiment of the present disclosure. The method may include one or more features of the above yarn spindle quality control method based on the knowledge graph. In an implementation, the method further includes the following step.

In step S301, the quality inspection result, the production parameter and the process parameter of the group of yarn spindles are stored in the knowledge graph for yarn spindle production and management, in a case where the quality inspection result is normal.

In the embodiment of the present disclosure, when the quality inspection result is normal, it may be considered that the process parameter corresponding to the yarn spindles is a normal value of the production parameter of the batch number corresponding to the yarn spindles, and the quality inspection result, the production parameter, and the process parameter of the group of yarn spindles may be recorded in the knowledge graph. After a period of statistics, the counted normal production parameters and process parameters may be used to update a normal range of a parameter. Moreover, the process parameter is associated with the production parameter, and each production device may have differences in the normal range of a corresponding process parameter based on actual situation of the device.

In the embodiment of the present disclosure, if a number of abnormalities of the quality inspection result reaches a set value, but there is no abnormal parameter, an emergency inspection task may be sent to inspect the device corresponding to the yarn spindles. If there is a fault in the device, a corresponding adjustment manner for the fault may be provided based on the knowledge graph. If there is no fault in the device, the normal range may be updated based on the newly stored production and process parameters in the knowledge graph.

In the embodiment of the present disclosure, in a case where the quality inspection result is abnormal, it is determined that the abnormal parameter is the production parameter, that is, at least one of the following situations occurs: device fault, spare part fault, device missing, or device shutdown. The abnormal parameter, a reason causing the abnormal parameter, and a maintenance manner at this time may be recorded after maintenance is completed, and used to update data in the knowledge graph for yarn spindle production and management.

According to the embodiment of the present disclosure, by updating the normal range of existing process parameter with new process parameter within the normal range, accuracy of process parameter has been improved, each production device may dynamically optimize its own production parameter while constantly updating to ensure the product quality, and the adjust manner corresponding to the abnormal parameter may be continuously recorded to improve the knowledge graph for yarn spindle production and management.

Figure 4:
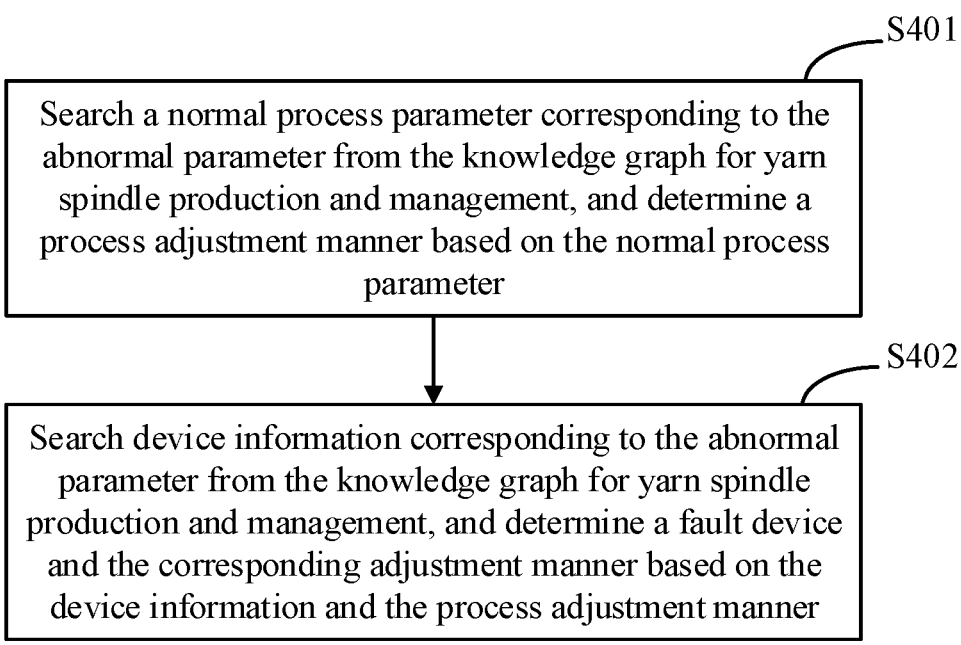
FIG. 4 is a schematic flowchart of a yarn spindle quality control method based on a knowledge graph according to another embodiment of the present disclosure.

FIG. 4 is a schematic flowchart of a yarn spindle quality control method based on a knowledge graph according to another embodiment of the present disclosure. The method may include one or more features of the above yarn spindle quality control method based on the knowledge graph. In an implementation, the step S102, that is, searching the adjustment manner corresponding to the production parameter and/or the process parameter from the knowledge graph for yarn spindle production and management, in the case where there is the abnormal parameter, includes the following steps.

In step S401, a normal process parameter corresponding to the abnormal parameter is searched from the knowledge graph for yarn spindle production and management, and a process adjustment manner is determined based on the normal process parameter.

In step S402, device information corresponding to the abnormal parameter is searched from the knowledge graph for yarn spindle production and management, and a fault device and the corresponding adjustment manner are determined based on the device information and the process adjustment manner.

In the embodiment of the present disclosure, if the abnormal parameter is the process parameter, the normal range of the process parameter may be searched from the knowledge graph for yarn spindle production and management based on the abnormal process parameter. The corresponding adjustment manner may be provided based on the normal range of the process parameter. For example, abnormal spinning speed of yarn spindles with a certain batch number during winding of a winding machine of a certain type is 2400 M/min, a normal range in the abnormality detection model or the knowledge graph is 2700 M/min to 2705 M/min, it may be recommended to increase the spinning speed based on the normal range, and may also provide a specific value that needs to be increased. During next production, the adjusted process parameter may be used to product yarn spindles. In a case where spinning speed of yarn spindles with a certain batch number during winding of a winding machine of a certain type is 2702.1 M/min, the spinning speed of the current production is normal.

In the embodiment of the present disclosure, if the abnormal parameter is a device parameter, the corresponding device information may be searched from the knowledge graph for yarn spindle production and management based on the abnormal process parameter. Furthermore, the process parameter and the device parameter of the same group of yarn spindles may have a corresponding relationship. If the abnormal parameter is the process parameter, the corresponding device information may be searched from the knowledge graph for yarn spindle production and management based on the device parameter corresponding to the abnormal process parameter.

According to the embodiment of the present disclosure, combining the knowledge graph may obtain a specific abnormal parameter as well as the adjustment manner corresponding to the abnormal parameter, quickly determine a source of a problem that leads to poor product quality, and provide a solution for the problem, thus is beneficial for improving error correction and quality monitoring capabilities in the production process of the chemical fiber, improving product qualification rate and quality, reducing amount of waste, reducing production costs, and improving production efficiency.

In an implementation, the device information corresponding to the abnormal parameter includes at least one of: a device and/or component that needs to be maintained, an upstream and downstream associated device and/or component of the device and/or component that needs to be maintained, a maintenance record of the device and/or component that needs to be maintained, warehousing information of a backup device and/or spare part, or procurement information of the backup device and/or spare part.

In the embodiment of the present disclosure, if the abnormal device parameter includes the line type and the machine number, or the device parameter corresponding to the abnormal process parameter includes the line type and the machine number, the device that needs to be maintained, such as the fault device, may be searched from the knowledge graph based on the line and machine number. The knowledge graph may also include the component included in the device that needs to be maintained, such as a fault component.

In the embodiment of the present disclosure, the upstream and downstream associated device may be a device corresponding to a preceding stage and/or subsequent stage of a production stage corresponding to the device that needs to be maintained in the production process. For example, a downstream device of the spinning box includes the winding machine. The upstream and downstream associated component may be a component in the upstream and downstream associated device of the device that needs to be maintained. Due to a reason causing a product quality problem, the upstream and downstream associated device/component may also be an upstream and downstream associated device/component of a certain production device. Determining of the upstream and downstream associated device/component is conducive to accurately locating the fault device.

In the embodiment of the present disclosure, the maintenance record of the device and/or component that needs to be maintained may include one or more of name, fault name, fault reason, fault time, fault frequency, maintenance time, maintenance manner, maintenance frequency, and the like of the device/component. Based on the previous maintenance record of the device, it may be determined whether replacement of the device/component is necessary. For example, if the maintenance frequency of a fuel injector in the spinning box is 3 times and reaches a maintenance frequency threshold, it may be recommended to replace the fuel injector.

In the embodiment of the present disclosure, the warehousing information of the backup device and/or spare part includes one or more of name, brand, type, specification parameter, warehousing location, warehousing quantity, in-warehouse time, ex-warehouse time, and factory ownership, and the like of the device and/or component. The procurement information of the backup device and/or spare part includes one or more of name, brand, type, specification parameter, ex-factory time, procurement frequency, purchaser, price, supplier, procurement quantity, and the like of the device and/or component.

According to the embodiment of the present disclosure, various information required during the maintenance of device and/or component may be obtained to provide data support and basis for generating the device adjustment manner such as a device maintenance strategy, and improve rationality and reliability of the maintenance strategy.

In an implementation, determining the device adjustment manner based on the device information includes initiating a maintenance task based on the device information corresponding to the abnormal parameter. Examples of the maintenance task include at least one of the following examples.

A first example in which a maintenance manner corresponding to the device/component that needs to be maintained is determined based on the maintenance record of the device/component that needs to be maintained, a maintenance task of a fault device and/or component, which includes an identification of the fault device and/or component, is initiated to a maintenance management device based on the maintenance manner.

In the embodiment of the present disclosure, maintenance manner may include maintaining a component of a device, replacing a component with a spare part, and the like. Based on the maintenance manner, the maintenance task may not only include the identification of the to-be-maintained/fault component, but also include the warehousing information of the backup device and/or spare part required for maintaining a fault device. Based on the maintenance strategy, a corresponding device and/or spare part is shipped from a warehouse and transported to a location of the fault device. For example, a device A that needs to be maintained has the following records in the knowledge graph: a component A1 of the device A has malfunctioned twice, and the component A1 has 3 spare parts in a warehouse B. In this case, the generated maintenance strategy may include replacing the component A1, and may be sent to the maintenance personnel's PDA and a spare part of the component A1 may be shipped from the warehouse B to a vicinity of the device A.

A second example in which a procurement task for the backup device and/or spare part is initiated to a procurement management system in a case where a local inventory of the backup device and/or spare part is less than a safety threshold, the procurement task includes the procurement information of a device and/or spare part that needs to be purchased.

In some examples, there may be a plurality of warehouses required for chemical production. A Local warehouse may include a warehouse that is close to the device that needs to be maintained, or a warehouse for which the device maintenance person has a permission. A remote warehouse may include a warehouse that is far away from the device that needs to be maintained, or a warehouse for which the device maintenance person does not have the permission. The local inventory may refer to quantity of the backup device and/or spare part included in the local warehouse, and remote inventory may refer to the quantity of backup device and/or spare part included in the remote warehouse. In the embodiment of the present disclosure, the local inventory may also include a set quantity of devices and/or spare parts. When the quantity of the devices and/or spare parts is less than the set quantity, the procurement request for the device and/or spare part is initiated to the procurement management system, and the procurement task is issued to a supplier after confirming the procurement request.

A third example in which presence of the backup device and/or spare part is searched from the remote inventory in the case where the local inventory of the backup device and/or spare part is less than the safety threshold, and a transfer task is initiated to a remote warehousing management device, which includes inventory information of a device and/or spare part that needs to be transferred, if the backup device and/or spare part is presented in the remote inventory.

In the embodiment of the present disclosure, inventory quantity and distance may be calculated comprehensively, and the transfer task is preferentially initiated to the warehousing management device of the nearby remote warehouse. If there is a plurality of remote warehouse having distance differences within a distance threshold, the transfer task is preferentially initiated to the warehousing management device of the remote warehouse with a larger inventory quantity.

A fourth example in which an emergency processing task is initiated in a case where each of the local inventory and the remote inventory of the backup device and/or spare part is less than the safety threshold, the emergency processing task includes an emergency procurement task and/or an idle device borrowing task.

In the embodiment of the present disclosure, when each of the local inventory and the remote inventory cannot meet a maintenance need, the emergency processing task may be initiated. For example, if there is an idle device of the same type in a local production line, the borrowing task may be initiated from a control device or related person's computer, PDA, and the like. Then, the idle device and/or the spare part in idle device may be removed from its original position to replace the fault spare part in the fault device. If the borrowing task is executed, borrowing information may be recorded in the knowledge graph. For example, if there is no idle device in the local production line, an emergency procurement task should be initiated from the control device or related person's computer, PDAs, and the like to purchase the corresponding device and/or spare part. The procurement task may include one or more of name, brand, specifications, key parameter, purchaser, price, supplier, and procurement quantity of the device/spare part to be purchased.

According to the embodiment of the present disclosure, reliable solutions may be provided for the maintenance task and various situations that may be encountered, thereby ensuring normal and efficient completion of the maintenance task, improving maintenance efficiency, and reducing economic losses caused by longer maintenance time. Furthermore, utilizing the maintenance task to adjust or borrow the device and/or spare part enhances flexibility of the maintenance strategy.

Figure 5:
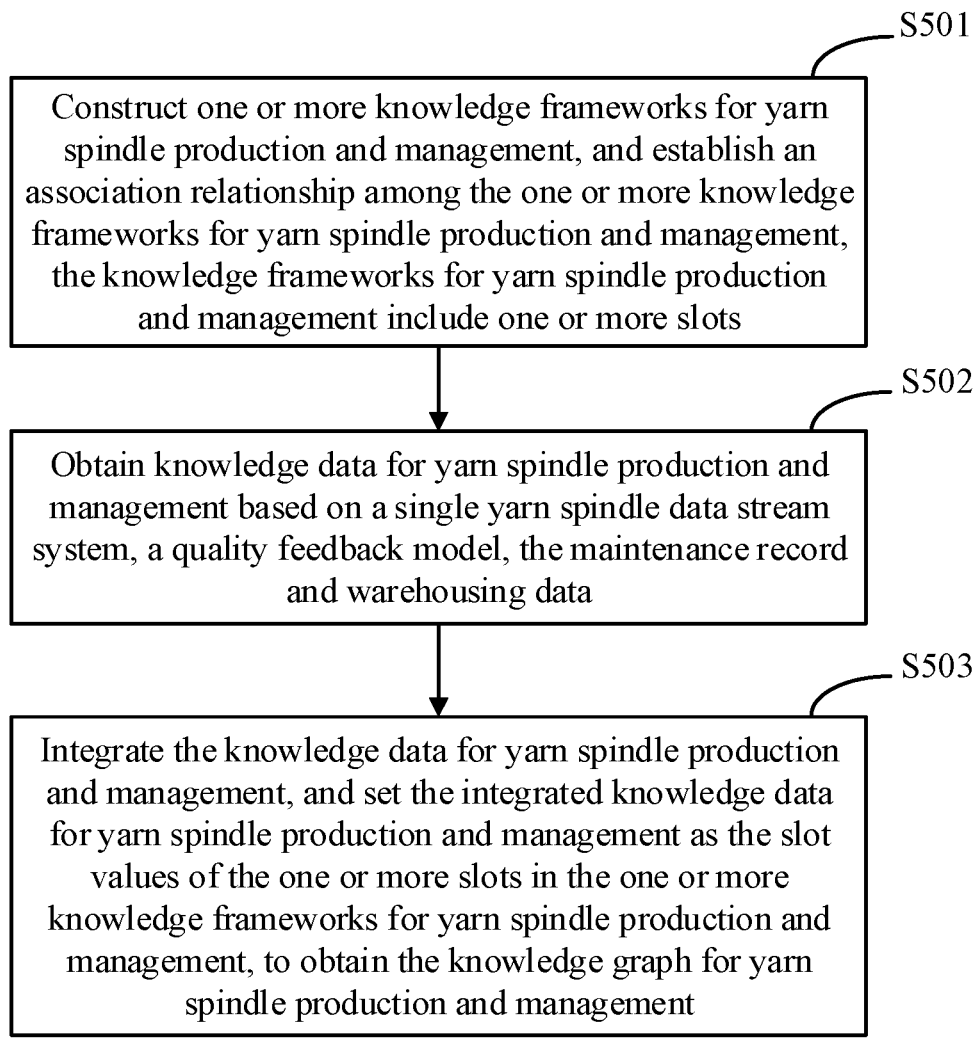
FIG. 5 is a schematic flowchart of a yarn spindle quality control method based on a knowledge graph according to another embodiment of the present disclosure.

FIG. 5 is a schematic flowchart of a yarn spindle quality control method based on a knowledge graph according to another embodiment of the present disclosure. The method may include one or more features of the above yarn spindle quality control method based on the knowledge graph. In an implementation, the method further includes the following steps.

In step S501, one or more knowledge frameworks for yarn spindle production and management are constructed, and an association relationship among the one or more knowledge frameworks for yarn spindle production and management is established, the knowledge frameworks for yarn spindle production and management include one or more slots.

In the embodiment of the present disclosure, the knowledge graph for yarn spindle production and management includes a plurality of frameworks, each framework includes a plurality of slots, each slot corresponds to a plurality of slot values. The respective frameworks have a specific association relationship. For example, a production parameter knowledge framework and a process parameter knowledge framework may each include a batch number slot, and may establish a corresponding relationship therebetween through the batch number slot. The specification, the production device, production time, each process parameter may be searched through the batch number. For another example, the process parameter knowledge framework includes the batch number slot, the production parameter knowledge framework includes a tension slot and a spinning speed slot. A corresponding relationship among the batch number slot, the tension slot and the spinning speed slot in the two frameworks may be established by indexing.

In step S502, knowledge data for yarn spindle production and management may be obtained based on a single yarn spindle data stream system, a quality feedback model, the maintenance record and warehousing data.

In the embodiment of the present disclosure, the knowledge data for yarn spindle production and management includes at least one of production parameter data, quality inspection result data, process parameter data, or device information data. The production parameter data may include line type data, machine number data, specification data, batch number data, doff number data, drop time data, and the like. The production parameter data may be obtained through the single yarn spindle data steam system, a yarn spindle lifecycle system, and the like. The quality inspection result data may include dye free color judgment spectrum information data, a dye free color judgment abnormal result data, the appearance detection result data, the physical and mechanical performance detection result data, and the like. The quality inspection result data may be obtained through the Raman spectrum device or the like. The process parameter data may include tension data, spinning speed data, oil content data, oil type data, oiling rate data, hot roller temperature data, fineness center value data, metering pump specification data, metering pump speed data, spinneret diameter data, spinneret aspect ratio data, full tube weight data, network pressure data, and the like. The process parameter data may be obtained through actual measurement or pre-configuration. The device information data may include device name data, device location number data, fault name data, fault reason data, fault time data, fault frequency data, maintenance time data, maintenance manner data, maintenance frequency data, warehousing location data, warehousing quantity data, in-warehouse time data, ex-warehouse time data, and factory ownership data. The deice information data may be obtained through the maintenance record and the warehousing data.

In step S503, the knowledge data for yarn spindle production and management is integrated, and the integrated knowledge data for yarn spindle production and management is set as the slot values of the one or more slots in the one or more knowledge frameworks for yarn spindle production and management, to obtain the knowledge graph for yarn spindle production and management.

In the embodiment of the present disclosure, integrating the knowledge data for yarn spindle production and management may include cleaning the obtained data, clustering the cleaned data, and storing the clustered data into different knowledge frameworks. For unstructured data, segment and deduplication may be performed on the data, and the processed data may be clustered and then respectively set as the slot values in different knowledge frameworks. For structured data, disambiguation and deduplication may be performed on the data, the disambiguation may include storing one of the data with different attribute names representing the same meaning, or include renaming and storing an attribute name of data with same attribute names representing different meanings. The deduplication may include storing one of data with the same attribute names representing the same meaning. The processed structured data is stored in the knowledge graph based on a corresponding relationship between the attribute names and slot names.

According to the embodiment of the present disclosure, the knowledge graph for yarn spindle production and management may be constructed based on various data involved in the production process of the chemical fiber, thereby ensuring reliability and credibility of the knowledge graph. By using the knowledge graph, different system data within a factory may be associated and integrated, thereby simplifying search steps and improving search efficiency. In addition, new data from the production process may be used to update the knowledge graph and improve its timeliness.

In an implementation, the one or more knowledge frameworks for yarn spindle production and management include the production parameter knowledge framework, an inspection result knowledge framework, the process parameter knowledge framework, a device information knowledge framework, a device maintenance record knowledge framework, and the association relationship between the knowledge frameworks.

In an implementation, the production parameter knowledge framework includes a specification slot, a batch number slot, a doff number slot, and a doff time slot. The inspection result knowledge framework includes a dye free color judgment spectrum information slot, a dye free color judgment abnormal result slot, an external detection result slot, and a physical and mechanical performance detection result slot. The process parameter knowledge framework includes the tension slot, the spinning speed slot, the oil content slot, the oil type slot, the oiling rate slot, the hot roller temperature slot, the fineness center value slot, the metering pump specification slot, the metering pump speed slot, the spinneret diameter slot, the spinneret aspect ratio slot, the full tube weight slot, and the network pressure slot. The device information knowledge framework includes a line type slot, a machine number slot, a device name slot, a device type slot, a warehousing information slot, a spare part slot, and a maintenance record slot. The device maintenance record knowledge framework includes a device name slot, a device location number slot, a fault/alarm information slot, and a maintenance information slot.

In the embodiment of the present disclosure, one slot may correspond to a plurality of slot values. For example, in the production parameter knowledge framework, slot values of the specification slot are data of one or more specifications, slot values of the batch number slot are data of one or more batch numbers, slot values of the doff number slot are data of one or more doff numbers, and slot values of doff time slot are data of one or more doff times. Similar, slot values in the inspection result knowledge frame, the process parameter knowledge frame, and the device information knowledge frame are corresponding data after being integrated, respectively.

In the embodiment of the present disclosure, a plurality of production and process parameters corresponding to the group of yarn spindles may be distributed in different slots of the plurality of knowledge frameworks, and the slots corresponding to the parameters of the group of yarn spindles have the association relationship.

According to the embodiment of the present disclosure, establishing the association relationships between the frameworks, the slots, and the slot values may enhance correlation and query ability of data. By using the frameworks with the slots, various data involved in the production process may be stored in different categories, thereby improving coherence of data in the knowledge graph.

Figure 6:
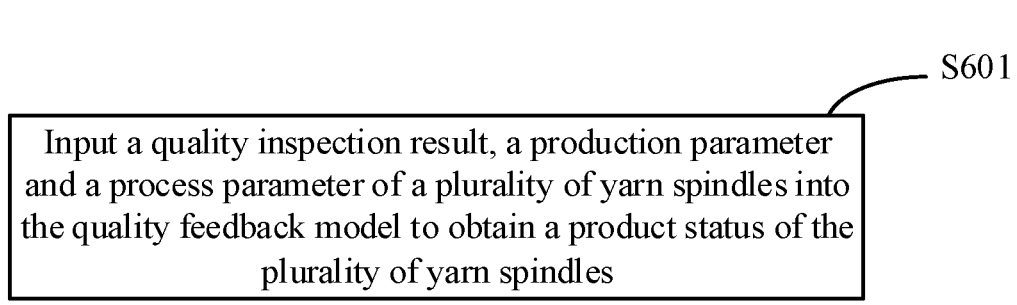
FIG. 6 is a schematic flowchart of a yarn spindle quality control method based on a knowledge graph according to another embodiment of the present disclosure.

FIG. 6 is a schematic flowchart of a yarn spindle quality control method based on a knowledge graph according to another embodiment of the present disclosure. The method may include one or more features of the above yarn spindle quality control method based on the knowledge graph. In an implementation, the method further includes the following step.

In step S601, a quality inspection result, a production parameter and a process parameter of a plurality of yarn spindles are input into the quality feedback model to obtain a product status of the plurality of yarn spindles.

In the embodiment of the present disclosure, the Raman spectrum device may be used to detect the chemical fiber of the yarn spindles to obtain the quality inspection result, and the production parameter and the process parameter are obtained based on the quality inspection result. The quality inspection result is input into the quality feedback model to obtain the product status of the yarn spindles, or the quality inspection result, the production parameter, and the process parameter are input into the quality feedback model to obtain the product status of the yarn spindles.

In an implementation, the product status includes at least one of a yield rate, a full roll rate, or a broken ends rate.

In the embodiment of the present disclosure, the yield rate may include a proportion of a number of yarn spindles that meet quality requirements in the group of yarn spindles to a total number of all the yarn spindles. The quality requirements for the group of yarn spindles may include meeting an appearance performance standard, a physical and mechanical performance standard, a dyeing performance standard, and a yarn spindle weight standard. The full roll rate may include a proportion of a number of yarn spindles that each has reached a full roll in the group of yarn spindles to the total number of all the yarn spindles. Full roll yarn spindles include yarn spindles that have not experienced filament breakage, abnormal filament path, and spindle weight meeting a full coil requirement during a winding process. The broken ends rate may include a value obtained by dividing a total number of times of broken ends of the production line or the winding machine within a fixed duration by the fixed duration. The yield rate, also known as an AA rate, represents a proportion of AA products in a batch number. The AA rate may also be called a premium product rate, and a calculation method may be that AA product weight/total production of the batch number=AA %.

In the embodiment of the present disclosure, the use of the quality feedback model may determine the quality of the yarn spindles based on the quality inspection result, the production parameter, and the process parameter, thereby improving efficiency of yarn spindle quality inspection. When the quality feedback model is used to inspect the quality of the yarn spindles, there is no need to consume any yarn spindle to make an inspection sample, saving inspection costs. The quality feedback model may be used to inspect each yarn spindle, improving reliability of the quality inspection result.

Figure 7:
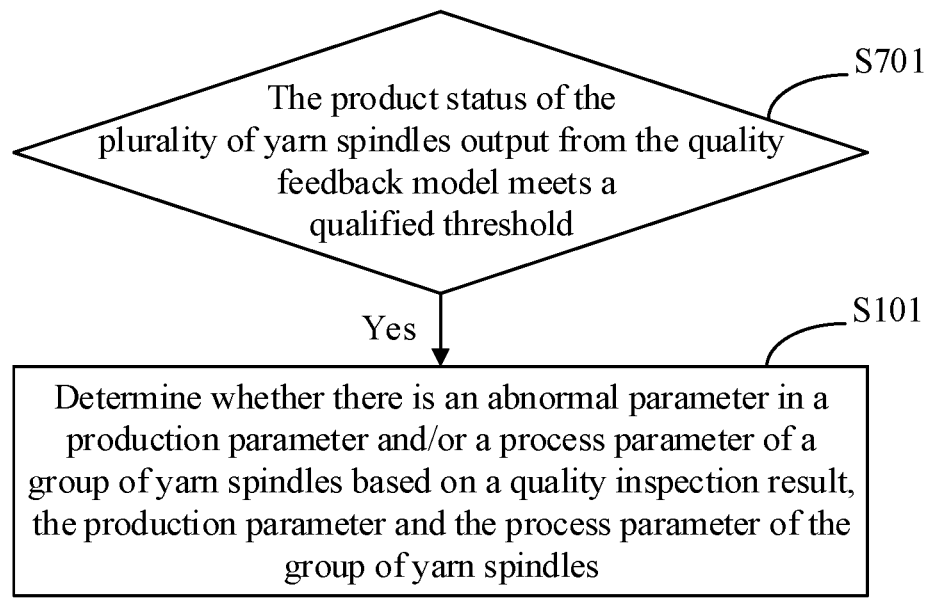
FIG. 7 is a schematic flowchart of a yarn spindle quality control method based on a knowledge graph according to another embodiment of the present disclosure.

FIG. 7 is a schematic flowchart of a yarn spindle quality control method based on a knowledge graph according to another embodiment of the present disclosure. The method may include one or more features of the above yarn spindle quality control method based on the knowledge graph. In an implementation, the method further includes the following step.

In step S701, the step S101, that is, determining whether there is the abnormal parameter in the production parameter and/or the process parameter of the group of yarn spindles based on the quality inspection result, the production parameter and the process parameter of the group of yarn spindles, is triggered to be executed in a case where the product status of the plurality of yarn spindles output from the quality feedback model meets a qualified threshold. The number of the yarn spindles input into the quality feedback model and the number of the group of the yarn spindles may be the same or different. For example, by inputting the quality inspection result, the production parameter, and the process parameter of 1000 yarn spindles into the quality feedback model, it is obtained that the yield rate does not meet the quality requirement. The 1000 yarn spindles may be divided into two groups and tested for any abnormal parameter in the production and/or process parameters of each of the two groups of yarn spindles.

In the embodiment of the present disclosure, whether the group of yarn spindles meets a product qualification standard may be determined based on at least one of the yield rate (the AA rate), the full coil rate, or the broken ends rate of the group of yarn spindles. In a case where the group of yarn spindles does not meet the product qualification standard, the knowledge graph is used to test whether there is any abnormal parameter during the production process of the group of yarn spindles. If there is the abnormal parameter, the adjustment manner corresponding to the abnormal parameter is obtained based on the knowledge graph, and if there is no the abnormal parameter, the production or process parameter will not be adjusted, and any issue that may cause the abnormal parameter in other processes may be detected.

In the embodiment of the present disclosure, inspecting the abnormal parameter when the yarn spindles do not meet the product qualification standard does not need to inspect all yarn spindles, thereby reducing the number of inspections, improving the inspection efficiency, and reducing computational power consumption.

In an implementation, a training process of the quality feedback model includes: inputting quality inspection results, process parameters and production parameters of yarn spindle training samples in a sample set into a first model constituted of a plurality layers of neural networks to output predicted product statuses; performing iterative training on the first model based on labeled product statuses of the yarn spindle training samples and a loss function constituted of the predicted product statuses to obtain a second model which is the quality feedback model after being trained. The sample set include a plurality of yarn spindle training samples obtained from the knowledge graph for yarn spindle production and management, and each of the plurality of yarn spindle training samples includes the interrelated quality inspection results, process parameters and production parameters.

In the embodiment of the present disclosure, the plurality layers of neural networks include an input layer, a middle layer and an output layer. The middle layer may include a plurality of layers. An input feature of the input layer may include the quality inspection results, the process parameters and the production parameters. An output features of the output layer may include the statuses of the predicted product statuses. Samples in the sample set may include the quality inspection results, the process parameters and the production parameters, and may further include the labeled product statuses which are obtained based on actual tested product statuses.

In the embodiment of the present disclosure, the output layer calculates a loss value based on the labeled product statuses and the predicted product statuses through the following loss value formula:

$$M=\alpha_1 S_1+\alpha_2 S_2+\alpha_3(1-S_3)+\alpha_4(1-S_4).$$

Here $S_1$ represents the AA rate, $S_2$ represents machine efficiency of the winding machine, $S_3$ represents the broken ends rate, $S_4$ represents a device fault rate, $\alpha_1$, $\alpha_2$, $\alpha_3$, and $\alpha_4$ represent weight coefficients of the parameters respectively, $\alpha_1+\alpha_2+\alpha_3+\alpha_4=1$, and initial values may be $\alpha_1=0.3$, $\alpha_2=0.3$, $\alpha_3=0.2$, $\alpha_4=0.2$. The machine efficiency may reflect continuous stability of the production process, and combined with the AA rate, it can directly reflect whether the process parameters are stable during production. The machine efficiency of the winding machine=(time length of the winding machine during production/planned operating time of the winding machine)*100%. The device fault rate is a direct and important indicator to measure stability and maintenance efficiency of a device. The more stable the process parameters and device parameters are or the more they match the production, the lower the fault rate. The device fault rate=(time length of device downtime/(24*60*actual days of a natural month)*100%.

When the loss value is greater than a set value, parameters of the model are adjusted, and new samples are input into the plurality layers of neural networks. Such process is iteratively performed until the loss value is less than the set value, and thus the quality feedback model is obtained.

In the embodiment of the present disclosure, the input feature of the input layer may include the quality inspection results and the production parameters that are input into the neural networks, and the output feature of the output layer may include predicted process parameters.

In the embodiment of the present disclosure, the sample set may include one or more of a training set, a testing set, and a validation set. The samples in the sample set may be obtained from historical data of the knowledge graph.

In the embodiment of the present disclosure, the quality feedback model trained based on the historical data may make the inspection results obtained by using the quality feedback model more accurate.

Figure 8:
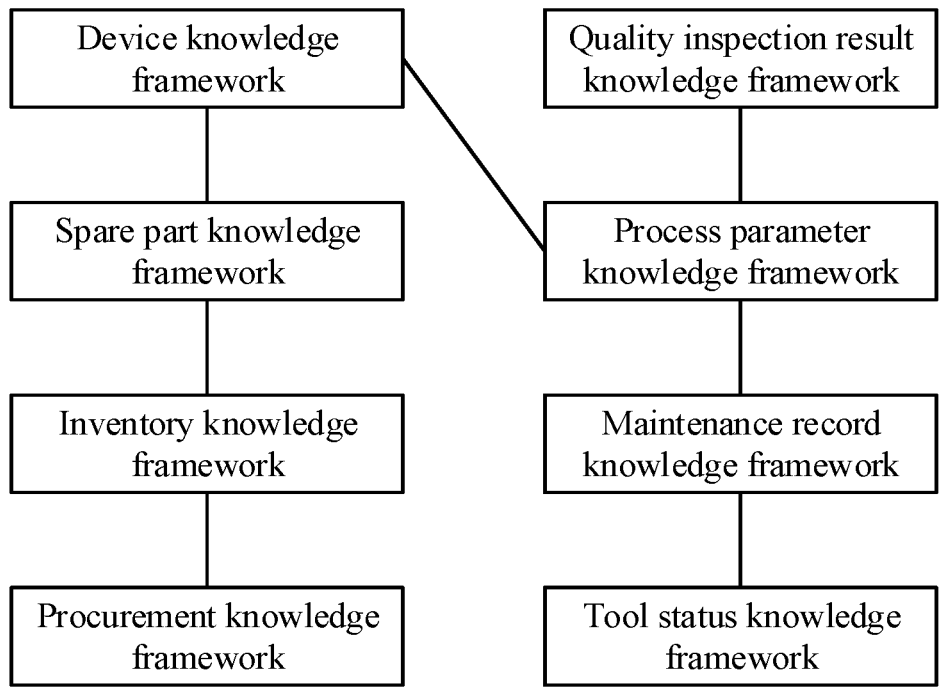
FIG. 8 is a schematic diagram of a part of a knowledge graph according to an embodiment of the present disclosure.

FIG. 8 is a schematic diagram of a part of a knowledge graph according to an embodiment of the present disclosure. As shown in FIG. 8, the part of the knowledge graph includes a device knowledge framework, a spare part knowledge framework, an inventory knowledge framework, a procurement knowledge framework, the process parameter knowledge framework, the maintenance record knowledge framework, the quality inspection result knowledge framework, and a tool status knowledge framework. In the knowledge graph, the device knowledge framework has an association relationship with the spare part knowledge framework, and the spare part knowledge framework has an association relationship with the inventory knowledge framework, the inventory knowledge framework has an association relationship with the procurement knowledge framework, the device knowledge framework also has an association relationship with the process parameter knowledge framework, the process parameter knowledge framework has an association relationship with the maintenance record knowledge framework, the maintenance record knowledge framework has an association relationship with the tool status knowledge framework, and the process parameter knowledge framework also has an association relationship with the quality inspection result knowledge framework. A knowledge association hierarchy among productions, devices and processes may be constituted through the part of the knowledge graph.

Figures 10, 11:
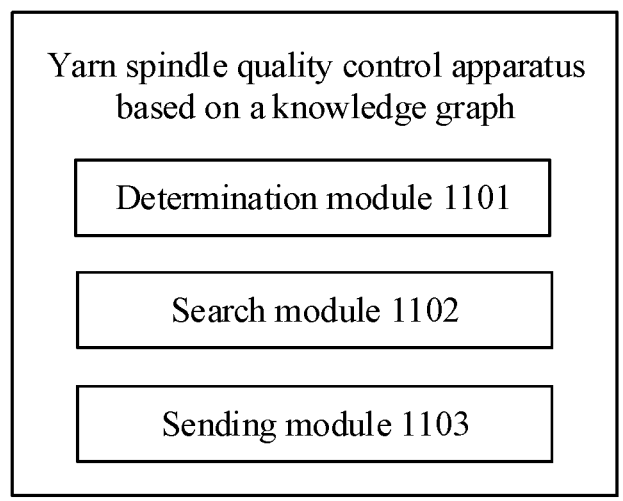
FIG. 10 is a schematic diagram of a process parameter knowledge framework according to an embodiment of the present disclosure.
FIG. 11 is a structural schematic diagram of a yarn spindle quality control apparatus based on a knowledge graph according to an embodiment of the present disclosure.

FIG. 9 is a schematic diagram of a device knowledge framework according to an embodiment of the present disclosure. The device knowledge framework may include the device name slot, the line type slot, the machine number slot. The device name slot is used to store the name of the device, such as reactor, spinning box, winding machine, and the like. The line type slot may be used to store the channel and the production line where the device is located, such as "WDC 1" and "WDC 2". The machine number slot may be used to store a location of the device on the production line, such as 01, 02, 12, 24, and the like. FIG. 10 is a schematic diagram of a process parameter knowledge framework according to an embodiment of the present disclosure. This knowledge framework may include the spinning speed slot, the fineness center value slot, the tension slot, the hot roller temperature slot, and the like. The spinning speed slot may be used to store the winding speed of the winding machine, such as a spinning speed range corresponding to pre-oriented yarn/yarndty (POY) may be "2710 M/min-2715 M/min", "2700 M/min-2705 M/min", and a spinning speed range corresponding to fully drawn yarn (FDY) may be "4100 M/min-4105 M/min", "4400 M/min-4405 M/min", or "4600 M/min-4605 M/min". The fineness center value slot may be used to store fineness of yarn, such as "167±2.5%" or "261±2.5%". The tension slot may be used to store the amount of the tension applied to the yarn, such as "10 cN", "14 cN", or "18 cN". The hot roller temperature slot may be used to store the temperature of the hot roller, such as "92-96° C." or "141-145° C.".

Through the knowledge graph, key equipment, spare parts, and inventory distribution of spare parts can be correlated. Combined with equipment failure maintenance records (detailed processing), in the event of equipment failure, problems can be quickly identified and analyzed based on historical maintenance experience, and maintenance suggestions can be provided to guide maintenance personnel in carrying out repairs. Automatically generate outbound tasks based on spare parts inventory and proprietary tool storage. In case of insufficient spare parts inventory, it can be automatically transferred from other warehouses. When the spare parts inventory is lower than the safety stock, procurement tasks can be automatically generated to guide procurement personnel in procurement.

Through the knowledge graph, it is also possible to search the knowledge graph based on the product inspection result (such as dye free color inspection result abnormality, external/chemical inspection result abnormality, and the like) to obtain an upstream process parameter abnormality (such as temperature, viscosity, motor current, voltage, and the like of a certain reactor), a normal range corresponding to an abnormal parameter name may be searched form the knowledge graph in combination with the abnormal parameter name, and a parameter adjustment suggestion may be provided based on the normal range.

Through the knowledge graph, it is also possible to provide an optimization suggestion of the process parameters for subsequent product production based on a normal production result, device/process corresponding historical data, and further optimize the production efficiency and the product quality, in the normal production process.

During the production process, in a case where the device or the process parameter is abnormal in a certain stage, a warning may be given, and a corresponding person may be notified to track and handle an emergency in a timely manner, and the adjustment suggestion may be provided to upstream and downstream associated device and the process parameter to ensure the yield rate of products.

FIG. 11 is a structural schematic diagram of a yarn spindle quality control apparatus based on a knowledge graph according to an embodiment of the present disclosure. The apparatus includes the following modules.

A determination module 1101 is configured to determine whether there is the abnormal parameter in the production parameter and/or the process parameter of the group of yarn spindles based on the quality inspection result, the production parameter and the process parameter of the group of yarn spindles.

A search module 1102 is configured to search the adjustment manner corresponding to the production parameter and/or the process parameter from the knowledge graph for yarn spindle production and management, in the case where there is the abnormal parameter.

A sending module 1103 is configured to send the adjustment manner corresponding to the production parameter and/or the process parameter to the related device of the group of yarn spindles.

Figure 12:
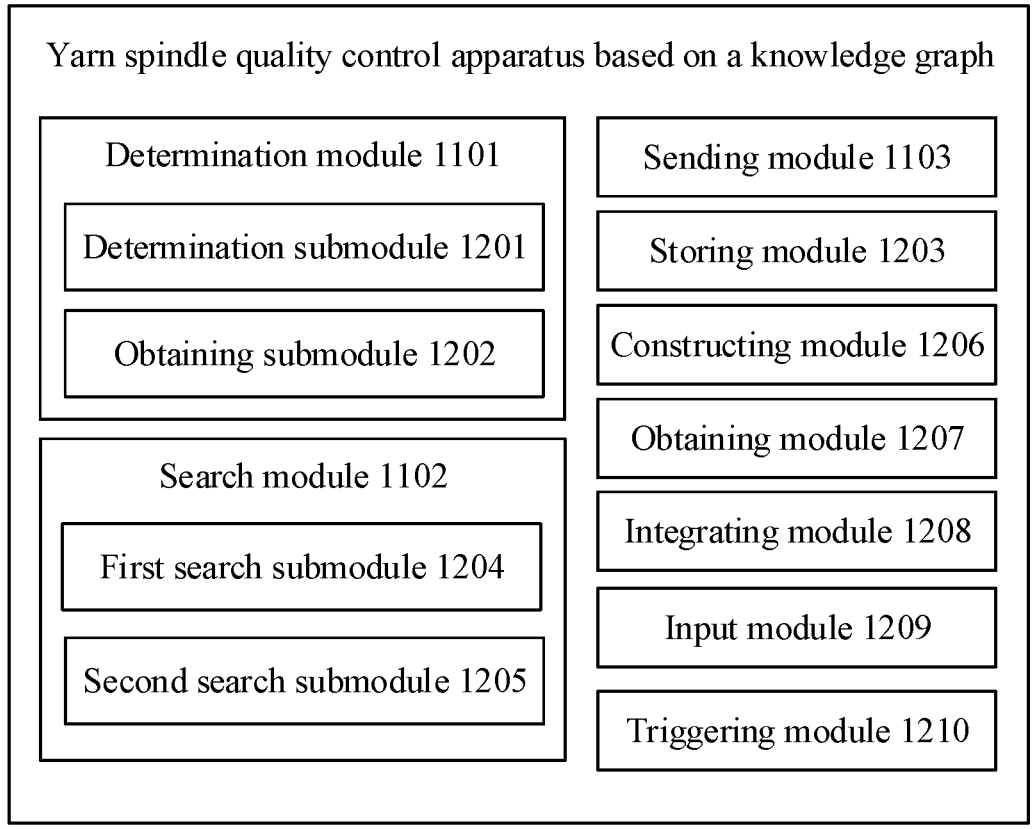
FIG. 12 is a structural schematic diagram of a yarn spindle quality control apparatus based on a knowledge graph according to an embodiment of the present disclosure.

FIG. 12 is a structural schematic diagram of a yarn spindle quality control apparatus based on a knowledge graph according to an embodiment of the present disclosure. The device may include one or more features of the above yarn spindle quality control apparatus based on the knowledge graph. In an implementation, the group of yarn spindles include the group of yarn spindles with the same batch number, the determination module 1101 includes the following submodules.

A determination submodule 1201 is configured to determine whether the production parameter and/or the process parameter of the group of yarn spindles is in the normal range based on the knowledge graph for yarn spindle production and management, in the case where the quality inspection result is abnormal.

An obtaining submodule 1202 is configured to obtain an abnormal parameter which is not in the normal range from the production parameter and/or the process parameter of the group of yarn spindles.

In an implementation, as shown in FIG. 12, the apparatus further includes a storing module 1203 configured to store the quality inspection result, the production parameter and the process parameter of the group of yarn spindles in the knowledge graph for yarn spindle production and management, in the case where the quality inspection result is normal.

In an implementation, the production parameter includes at least one of the line type, the machine number, the specification, the batch number, the doff number, or the doff time. The quality inspection result includes at least one of the dye free color judgment spectrum information, the dye free color judgment abnormal result, the appearance detection result, or the physical and mechanical performance detection result. The process parameter includes at least one of the tension, the spinning speed, the oil content, the oil type, the oiling rate, the hot roller temperature, the fineness center value, the metering pump specification, the metering pump speed, the spinneret diameter, the spinneret aspect ratio, the full tube weight, or the network pressure.

In an implementation, as shown in FIG. 12, the search module 1102 includes the following submodules.

A first search submodule 1204 is configured to search the normal process parameter corresponding to the abnormal parameter from the knowledge graph for yarn spindle production and management, and determine the process adjustment manner based on the normal process parameter.

A second search submodule 1205 is configured to search the device information corresponding to the abnormal parameter from the knowledge graph for yarn spindle production and management, and determine the device adjustment manner based on the device information.

In an implementation, the device information corresponding to the abnormal parameter includes at least one of the device and/or component that needs to be maintained, the upstream and downstream associated device and/or component of the device and/or component that needs to be maintained, the maintenance record of the device and/or component that needs to be maintained, the warehousing information of the backup device and/or spare part, and the procurement information of the backup device and/or spare part.

In an implementation, the second search submodule 1205 is further configured to initiate the maintenance task based on the device information corresponding to the abnormal parameter. The maintenance task includes at least one of:
- determining the maintenance manner corresponding to the device/component that needs to be maintained based on the maintenance record of the device/component that needs to be maintained, initiating the maintenance task of the fault device and/or component, which includes the identification of the fault device and/or component, to the maintenance management device based on the maintenance manner;
- initiating the procurement task for the backup device and/or spare part to the procurement management system in the case where the local inventory of the backup device and/or spare part is less than the safety threshold, the procurement task includes the procurement information of the device and/or spare part that needs to be purchased;
- searching presence of the backup device and/or spare part from the remote inventory in the case where the local inventory of the backup device and/or spare part is less than the safety threshold, and initiating the transfer task to the remote warehousing management device, which includes inventory information of a device and/or spare part that needs to be transferred, if the backup device and/or spare part is presented in the remote inventory; or
- initiating the emergency processing task in the case where each of the local inventory and the remote inventory of the backup device and/or spare part is less than the safety threshold, the emergency processing task includes the emergency procurement task and/or the idle device borrowing task.

In an implementation, as shown in FIG. 12, the apparatus further includes the following modules.

A constructing module 1206 is configured to construct one or more knowledge frameworks for yarn spindle production and management, and establish the association relationship among the one or more knowledge frameworks for yarn spindle production and management, the knowledge frameworks for yarn spindle production and management include one or more slots.

An obtaining module 1207 is configured to obtain the knowledge data for yarn spindle production and management based on the single yarn spindle data stream system, the quality feedback model, the maintenance record and warehousing data.

An integrating module 1208 is configured to integrate the knowledge data for yarn spindle production and management, and set the integrated knowledge data for yarn spindle production and management as the slot values of the one or more slots in the one or more knowledge frameworks for yarn spindle production and management, to obtain the knowledge graph for yarn spindle production and management.

In an implementation, the one or more knowledge frameworks for yarn spindle production and management include the production parameter knowledge framework, an inspection result knowledge framework, the process parameter knowledge framework, a device information knowledge framework, a device maintenance record knowledge framework, and the association relationship between the knowledge frameworks.

The production parameter knowledge framework includes the specification slot, the batch number slot, the doff number slot, and the doff time slot. The inspection result knowledge framework includes the dye free color judgment spectrum information slot, the dye free color judgment abnormal result slot, the external detection result slot, and the physical and mechanical performance detection result slot. The process parameter knowledge framework includes the tension slot, the spinning speed slot, the oil content slot, the oil type slot, the oiling rate slot, the hot roller temperature slot, the fineness center value slot, the metering pump specification slot, the metering pump speed slot, the spinneret diameter slot, the spinneret aspect ratio slot, the full tube weight slot, and the network pressure slot. The device information knowledge framework includes the line type slot, the machine number slot, the device name slot, the device type slot, the warehousing information slot, the spare part slot, and the maintenance record slot. The device maintenance record knowledge framework includes the device name slot, the device location number slot, the fault/alarm information slot, and the maintenance information slot.

The knowledge data for yarn spindle production and management includes at least one of the production parameter data, the quality inspection result data, the process parameter data, or the device information data.

In an implementation, as shown in FIG. 12, the apparatus further includes an input module 1209 configured to input a quality inspection result, a production parameter and a process parameter of a plurality of yarn spindles into the quality feedback model to obtain the product status of the plurality of yarn spindles.

In an implementation, the quality status includes at least one of the yield rate, the full roll rate, or the broken ends rate.

In an implementation, as shown in FIG. 12, the apparatus further includes a triggering module 1210 configured to trigger performing of determining whether there is the abnormal parameter in the production parameter and/or the process parameter of the group of yarn spindles based on the quality inspection result, the production parameter and the process parameter of the group of yarn spindles, when the product status of the plurality of yarn spindles output from the quality feedback model meets the qualified threshold.

In an implementation, the training process of the quality feedback model includes:
  inputting the quality inspection results, the process parameters and the production parameters of the yarn spindle training samples in the sample set into the first model constituted of a plurality layers of neural networks to output the predicted product statuses; and
  performing the iterative training on the first model based on the labeled product statuses of the yarn spindle training samples and the loss function constituted of the predicted product statuses to obtain the second model which is the quality feedback model after being trained.

The sample set includes a plurality of yarn spindle training samples obtained from the knowledge graph for yarn spindle production and management, and each of the plurality of yarn spindle training samples includes a quality inspection result, a process parameter and a production parameter which are interrelated without each other.

In an implementation, the related device of the group of yarn spindles includes at least one of the production device, the terminal device or the control device.

The specific functions and examples of each module and submodule of the device according to the embodiment of the present disclosure may be described in the corresponding steps of the above method embodiments, and will not be repeated here.

In the technical solution of the present disclosure, the acquisition, storage and application of the user's personal information involved are all in compliance with the provisions of relevant laws and regulations, and do not violate public order and good customs.

Figure 13:
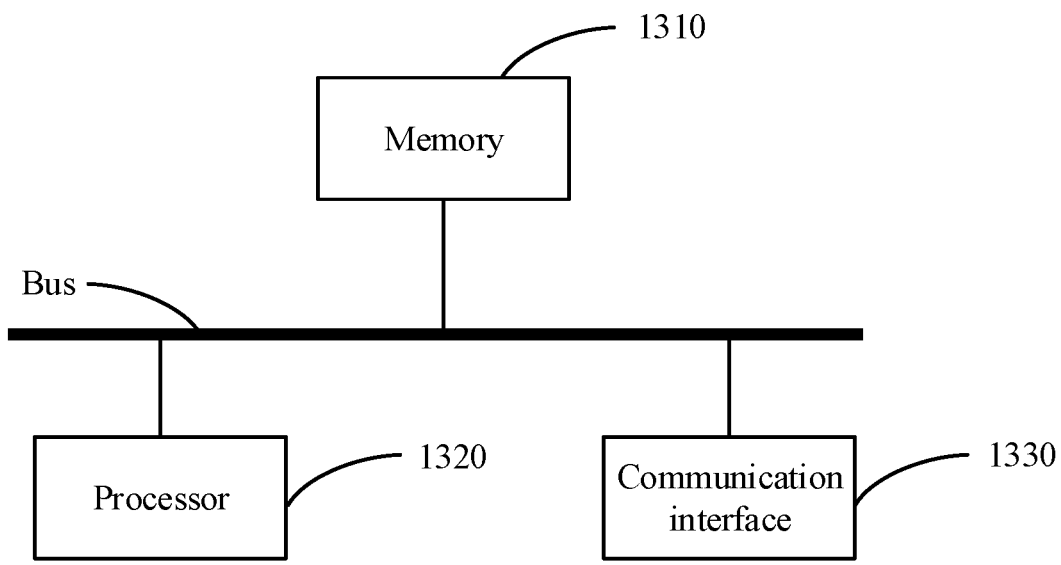
FIG. 13 is a block diagram of an electronic device for implementing an embodiment of the present disclosure.

FIG. 13 is a block diagram of an electronic device for implementing an embodiment of the present disclosure. As shown in FIG. 13, the electronic device includes a memory 1310 and a processor 1320, the memory 1310 stores a computer program is capable of being run on the processor 1320. Each of a number of memory 1310 and a number of processor 1320 may be one or more. The memory 1310 may store one or more computer programs that, when executed by the electronic device, cause the electronic device to execute the methods provided in the above method embodiments. The electronic device may also include a communication interface 1330 for communicating with an external device for data exchange and transmission.

If the memory 1310, the processor 1320, and the communication interface 1330 are implemented independently, the memory 1310, the processor 1320, and the communication interface 1330 may be connected to each other and communicate with each other through a bus. The bus may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and the like. For ease of representation, only one thick line is used to represent the bus in FIG. 13, but it does not mean that there is only one bus or one type of bus.

Alternatively, in terms of specific implementation, if the memory 1310, the processor 1320, and the communication interface 1330 are integrated on a single chip, the memory 1310, the processor 1320, and the communication interface 1330 may communicate with each other through internal interfaces.

It should be understood that the above processor may be a Central Processing Unit (CPU), or may be another general-purpose processor, a Digital Signal Processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor or any conventional processor. It is worth noting that processor may be a processor that supports an advanced RISC machine (ARM) architecture.

Further, alternatively, the above memory may include a read-only memory and a random access memory, as well as a non-volatile random access memory. The memory may be either a volatile memory or a non-volatile memory, or may include both the volatile memory and the non-volatile memory. The non-volatile memory may include a read-only memory (ROM), a programmable read-only memory (PROM), an erasable programmable read-only memory (EPROM), an electrically erasable programmable read-only memory (EEPROM), or a flash memory. The volatile memory may include a random access memory (RAM), which is used as an external cache. Many forms of the RAM are available through illustrative but not restrictive explanations, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink DRAM (SLDRAM) and a direct RAMBUS RAM (DR RAM).

In the above embodiments, it may be fully or partially implemented through software, hardware, firmware, or any combination thereof. When implemented using the software, it may be fully or partially implemented in a form of a computer program product. The computer program product includes one or more computer instructions. When loading and executing the computer instructions on a computer, all or part of the processes or functions described in the embodiments of the present disclosure are generated. The computer may be a general-purpose computer, a specialized computer, a computer network, or other programmable device. The computer instructions may be stored in a computer readable storage medium or transmitted from one computer readable storage medium to another, for example, the computer instructions may be transmitted from a website, a computer, a server or a data center to another website site, computer, server, or data center through a wired (such as a coaxial cable, an optical fiber, a digital subscriber line (DSL)) or wireless (such as infrared, Bluetooth, microwave, or the like) manner. The computer readable storage medium may be any available medium that the computer may access, or a data storage device such as a server or data center that includes one or more integrated available medium. The available medium may be a magnetic medium (such as a floppy disk, a hard drive, a magnetic tape), an optical medium (such as a digital Versatile disc (DVDs)), or a semiconductor medium (such as a solid state disk (SSDs)), or the like. It is worth noting that the computer readable storage medium mentioned in this disclosure may be the non-volatile storage medium, in other words, it may be a non-transient storage medium.

Those having ordinary sill in the art may understand that all or part of the steps to implement the above embodiments may be completed through hardware, or by instructing relevant hardware through programs. The programs may be stored in the computer readable storage medium, which may be a read only memory, a magnetic disk, an optical disk, or the like.

In the description of the embodiments of the present disclosure, reference terms "one embodiment", "some embodiments", "examples", "specific examples", "some examples", or the like mean that specific features, structures, materials, or characteristics described in combination with an embodiment or example are included in at least one embodiment or example of the present disclosure. Moreover, the specific features, structures, materials, or characteristics described may be combined in an appropriate manner in any one or more embodiments or examples. In addition, those having ordinary skill in the art may integrate and combine different embodiments or examples described in the specification, as well as features of different embodiments or examples, without mutual contradiction.

In the description of the embodiments of the present disclosure, "/" means "or", unless otherwise specified. For example, "A/B" means A or B. "And/or" herein only an association relationship for describing associated objects, means there are three relationships. For example, "A and/or B" may means there is only A, there is both A and B, and there is only B.

In the description of the embodiments of the present disclosure, terms "first" and "second" are only used for a descriptive purpose and cannot be understood as indicating or implying relative importance or implying the quantity of the indicated technical features. Therefore, features limited to "first" and "second" may explicitly or implicitly include one or more of these features. In the description of the embodiments of the present disclosure, unless otherwise specified, the meaning of "a plurality of" refers to two or more.

The foregoing is only exemplary embodiments of the disclosure and are not intended to limit thereto. Any modification, equivalent replacement, improvement, and the like made within the spirit and principles of the disclosure shall be included within the scope of protection of the disclosure.

What is claimed is:

1. A yarn spindle quality control method based on a knowledge graph, comprising:
    detecting a plurality of yarn spindles, to obtain a quality inspection result of the plurality of yarn spindles, by:
        inspecting, by a Raman spectrum device, chemical fibers of the plurality of yarn spindles, to obtain a Raman spectrum graph of chemical fibers of the plurality of yarn spindles,
        scanning, by a scanning electron microscope, chemical fibers of the plurality of yarn spindles, to obtain photos of the chemical fibers of the plurality of yarn spindles,
        analyzing the Raman spectrum graph to obtain a dye free color judgment result of the plurality of yarn spindles characterizing prediction results on dyeing uniformity of the plurality of yarn spindles, and
        analyzing the photos of the chemical fibers of the plurality of yarn spindles, to obtain an appearance detection result of the plurality of yarn spindles characterizing whether appearances of the plurality of yarn spindles meet a production standard;
    querying from a single-spindle data stream system to obtain a production parameter and/or process parameter of the plurality of yarn spindles of a same batch number, wherein the production parameter of the plurality of yarn spindles comprises at least one of a line type, a machine number, a specification, a batch number, a doff number, or doff time, and the process parameter of the plurality of yarn spindles comprises at least one of tension, spinning speed, an oil content, an oil type, an oiling rate, hot roller temperature, a fineness center value, a metering pump specification, metering pump speed, a spinneret diameter, a spinneret aspect ratio, a full tube weight, or network pressure;
    determining, by a yarn spindle quality control apparatus, whether there is an abnormal parameter in a production parameter and/or a process parameter of a group of yarn spindles which is all or part of the plurality of yarn spindles, based on a quality inspection result of the group of yarn spindles,
    comprising:
        determining that the quality inspection result of the group of yarn spindles is abnormal;
        comparing the production parameter and/or the process parameter of the group of yarn spindles with a normal parameter range stored in the knowledge graph for yarn spindle production and management; wherein the knowledge graph is constructed and updated based on knowledge data captured from the single-spindle data stream system, a quality feedback model, a maintenance record and warehousing data; and
        obtaining an abnormal parameter which is not in the normal parameter range from the production parameter and/or the process parameter of the group of yarn spindles;
    querying, by the yarn spindle quality control apparatus, an adjustment manner corresponding to the production parameter and/or the process parameter of the group of yarn spindles from the knowledge graph for yarn spindle production and management, comprising:
        searching a normal process parameter corresponding to the determined abnormal parameter from the knowledge graph for yarn spindle production and management; and
        determining, based on the normal process parameter, an adjustment manner for a fault device that corresponds to the determined abnormal parameter; and
    sending, by the yarn spindle quality control apparatus, the adjustment manner to a related device of the group of yarn spindles, thereby adjusting the fault device of the group of yarn spindles to address the determined abnormal parameter.

2. The method of claim 1, further comprising:
storing the quality inspection result of the group of yarn spindles, the production parameter of the group of yarn spindles and the process parameter of the group of yarn spindles in the knowledge graph for the yarn spindle production and management, in a case where the quality inspection result of the group of yarn spindles is normal.

3. The method of claim 1, wherein
the dye free color judgment result includes at least one of: dye free color judgment spectrum information, or a dye free color judgment abnormal result; and
the quality inspection result further comprises at least one of: an appearance detection result, or a physical and mechanical performance detection result; wherein the appearance detection result indicates whether an appearance of the yarn spindle meets a production standard, and the physical and mechanical performance detection result is obtained by detecting physical and mechanical properties of the yarn spindle.

4. The method of claim 1, wherein determining, based on the normal process parameter, the adjustment manner for the fault device that corresponds to the determined abnormal parameter, comprises:
determining a process adjustment manner based on the normal process parameter,
searching device information corresponding to the determined abnormal parameter from the knowledge graph for yarn spindle production and management, and
determining a device adjustment manner based on the device information.

5. The method of claim 4, wherein determining the device adjustment manner based on the device information comprises:
initiating a maintenance task based on the device information corresponding to the abnormal parameter, the maintenance task comprises at least one of:
determining a maintenance manner corresponding to a device/component that needs to be maintained based on a maintenance record of the device/component that needs to be maintained, initiating a maintenance task of a fault device and/or component, which comprises an identification of the fault device and/or component, to a maintenance management device based on the maintenance manner;
initiating a procurement task for a backup device and/or spare part to a procurement management system in a case where a local inventory of the backup device and/or spare part is less than a safety threshold, the procurement task comprises procurement information of a device and/or spare part that needs to be purchased;
searching presence of the backup device and/or spare part from a remote inventory in a case where the local inventory of the backup device and/or spare part is less than the safety threshold, and initiating a transfer task, which comprises inventory information of a device and/or spare part that needs to be transferred, to a remote warehousing management device, if the backup device and/or spare part is presented in the remote inventory; or
initiating an emergency processing task which comprises an emergency procurement task and/or an idle device borrowing task, in a case where each of the local inventory and the remote inventory of the backup device and/or spare part is less than the safety threshold.

6. The method of claim 4, wherein the device information corresponding to the abnormal parameter comprises at least one of: a device and/or component that needs to be maintained, an upstream and downstream associated device and/or component of the device and/or component that needs to be maintained, a maintenance record of the device and/or component that needs to be maintained, warehousing information of a backup device and/or spare part, or procurement information of the backup device and/or spare part.

7. The method of claim 1, further comprising:
constructing one or more knowledge frameworks for the yarn spindle production and management,
establishing an association relationship among the one or more knowledge frameworks for the yarn spindle production and management, wherein the knowledge frameworks for the yarn spindle production and management include one or more slots,
obtaining knowledge data for the yarn spindle production and management based on the single-spindle data stream system, a quality feedback model, a maintenance record and warehousing data,
integrating the knowledge data for the yarn spindle production and management, and
setting the integrated knowledge data for the yarn spindle production and management as slot values of the one or more slots in the one or more knowledge frameworks for the yarn spindle production and management, to obtain the knowledge graph for the yarn spindle production and management.

8. The method of claim 7, wherein the one or more knowledge frameworks for the yarn spindle production and management comprise a production parameter knowledge framework, an inspection result knowledge framework, a process parameter knowledge framework, a device information knowledge framework, a device maintenance record knowledge framework, and an association relationship between the knowledge frameworks,
wherein the production parameter knowledge framework comprises a specification slot, a batch number slot, a doff number slot, and a doff time slot, the inspection result knowledge framework comprises a dye free color judgment spectrum information slot, a dye free color judgment abnormal result slot, an external detection result slot, and a physical and mechanical performance detection result slot, the process parameter knowledge framework comprises a tension slot, a spinning speed slot, an oil content slot, an oil type slot, an oiling rate slot, a hot roller temperature slot, a fineness center value slot, a metering pump specification slot, a metering pump speed slot, a spinneret diameter slot, a spinneret aspect ratio slot, a full tube weight slot, and a network pressure slot, the device information knowledge framework comprises a line type slot, a machine number slot, a device name slot, a device type slot, a warehousing information slot, a spare part slot, and a maintenance record slot, the device maintenance record knowledge framework comprises a device name slot, a device location number slot, a fault/alarm information slot, and a maintenance information slot, and
wherein the knowledge data for the yarn spindle production and management comprises at least one of production parameter data, quality inspection result data, process parameter data, or device information data.

9. The method of claim 1, further comprising:
inputting the quality inspection result of the plurality of yarn spindles, the production parameter of the plurality of yarn spindles and the process parameter of the plurality of yarn spindles into a quality feedback model to obtain a product status of the plurality of yarn spindles.

10. The method of claim 9, wherein the product status includes at least one of a yield rate, a full roll rate, or a broken ends rate.

11. The method of claim 9, wherein before the determining of whether there is the abnormal parameter in the production parameter and/or the process parameter of the group of yarn spindles, based on the quality inspection result of the group of yarn spindles, the method further comprises:
determining that the product status of the plurality of yarn spindles output from the quality feedback model meets a qualified threshold.

12. The method of claim 9, wherein a training process of the quality feedback model comprises:
inputting quality inspection results, process parameters and production parameters of yarn spindle training samples in a sample set into a first model constituted of a plurality layers of neural networks to output predicted product statuses; and
performing iterative training on the first model based on labeled product statuses of the yarn spindle training samples and a loss function constituted of the predicted product statuses to obtain a second model which is the quality feedback model after being trained,
wherein the sample set comprises a plurality of yarn spindle training samples obtained from the knowledge graph for the yarn spindle production and management, and each of the plurality of yarn spindle training samples comprises a quality inspection result, a process parameter and a production parameter which are interrelated without each other.

13. An electronic device, comprising:
at least one processor; and
a memory connected in communication with the at least one processor;
wherein the memory stores an instruction executable by the at least one processor, and the instruction, when executed by the at least one processor, enables the at least one processor to execute:
detecting a plurality of yarn spindles, to obtain a quality inspection result of the plurality of yarn spindles, by:
inspecting, by a Raman spectrum device, chemical fibers of the plurality of yarn spindles, to obtain a Raman spectrum graph of chemical fibers of the plurality of yarn spindles,
scanning, by a scanning electron microscope, chemical fibers of the plurality of yarn spindles, to obtain photos of the chemical fibers of the plurality of yarn spindles,
analyzing the Raman spectrum graph to obtain a dye free color judgment result of the plurality of yarn spindles characterizing prediction results on dyeing uniformity of the plurality of yarn spindles, and
analyzing the photos of the chemical fibers of the plurality of yarn spindles, to obtain an appearance detection result of the plurality of yarn spindles characterizing whether appearances of the plurality of yarn spindles meet a production standard;
querying from a single-spindle data stream system to obtain a production parameter and/or process parameter of the plurality of yarn spindles of a same batch number, wherein the production parameter of the plurality of yarn spindles comprises at least one of a line type, a machine number, a specification, a batch number, a doff number, or doff time, and the process parameter of the plurality of yarn spindles comprises at least one of tension, spinning speed, an oil content, an oil type, an oiling rate, hot roller temperature, a fineness center value, a metering pump specification, metering pump speed, a spinneret diameter, a spinneret aspect ratio, a full tube weight, or network pressure;
enabling a yarn spindle quality control apparatus to determine whether there is an abnormal parameter in a production parameter and/or a process parameter of a group of yarn spindles which is all or part of the plurality of yarn spindles, based on a quality inspection result of the group of yarn spindles, by:
determining that the quality inspection result of the group of yarn spindles is abnormal;
comparing the production parameter and/or the process parameter of the group of yarn spindles with a normal parameter range stored in the knowledge graph for yarn spindle production and management; wherein the knowledge graph is constructed and updated based on knowledge data captured from the single-spindle data stream system, a quality feedback model, a maintenance record and warehousing data; and
obtaining an abnormal parameter which is not in the normal parameter range from the production parameter and/or the process parameter of the group of yarn spindles;
enabling the yarn spindle quality control apparatus to query an adjustment manner corresponding to the production parameter and/or the process parameter of the group of yarn spindles from a knowledge graph for yarn spindle production and management, comprising:
searching a normal process parameter corresponding to the determined abnormal parameter from the knowledge graph for yarn spindle production and management; and
determining, based on the normal process parameter, an adjustment manner for a fault device that corresponds to the determined abnormal parameter; and
enabling the yarn spindle quality control apparatus to send the adjustment manner to a related device of the group of yarn spindles, thereby adjusting the fault device of the group of yarn spindles to address the determined abnormal parameter.

14. The electronic device of claim 13, wherein the instruction, when executed by the at least one processor, enables the at least one processor to execute:
enabling the yarn spindle quality control apparatus to store the quality inspection result of the group of yarn spindles, the production parameter of the group of yarn spindles and the process parameter of the group of yarn spindles in the knowledge graph for the yarn spindle production and management, in a case where the quality inspection result of the group of yarn spindles is normal.

15. The electronic device of claim 13, wherein
the dye free color judgment result includes at least one of: dye free color judgment spectrum information, or a dye free color judgment abnormal result; and
the quality inspection result further comprises at least one of: an appearance detection result, or a physical and mechanical performance detection result; wherein the appearance detection result indicates whether an appearance of the yarn spindle meets a production standard, and the physical and mechanical performance detection result is obtained by detecting physical and mechanical properties of the yarn spindle.

16. A non-transitory computer-readable storage medium storing a computer instruction thereon, wherein the computer instruction is used to cause a computer to execute:

detecting a plurality of yarn spindles, to obtain a quality inspection result of the plurality of yarn spindles, by:

inspecting, by a Raman spectrum device, chemical fibers of the plurality of yarn spindles, to obtain a Raman spectrum graph of chemical fibers of the plurality of yarn spindles, scanning, by a scanning electron microscope, chemical fibers of the plurality of yarn spindles, to obtain photos of the chemical fibers of the plurality of yarn spindles, analyzing the Raman spectrum graph to obtain a dye free color judgment result of the plurality of yarn spindles characterizing prediction results on dyeing uniformity of the plurality of yarn spindles, and analyzing the photos of the chemical fibers of the plurality of yarn spindles, to obtain an appearance detection result of the plurality of yarn spindles characterizing whether appearances of the plurality of yarn spindles meet a production standard;

querying from a single-spindle data stream system to obtain a production parameter and/or process parameter of the plurality of yarn spindles of a same batch number, wherein the production parameter of the plurality of yarn spindles comprises at least one of a line type, a machine number, a specification, a batch number, a doff number, or doff time, and the process parameter of the plurality of yarn spindles comprises at least one of tension, spinning speed, an oil content, an oil type, an oiling rate, hot roller temperature, a fineness center value, a metering pump specification, metering pump speed, a spinneret diameter, a spinneret aspect ratio, a full tube weight, or network pressure;

enabling a yarn spindle quality control apparatus to determine whether there is an abnormal parameter in a production parameter and/or a process parameter of a group of yarn spindles which is all or part of the plurality of yarn spindles, based on a quality inspection result of the group of yarn spindles, by:

determining that the quality inspection result of the group of yarn spindles is abnormal;

comparing the production parameter and/or the process parameter of the group of yarn spindles with a normal parameter range stored in the knowledge graph for yarn spindle production and management; wherein the knowledge graph is constructed and updated based on knowledge data captured from the single-spindle data stream system, a quality feedback model, a maintenance record and warehousing data; and obtaining an abnormal parameter which is not in the normal parameter range from the production parameter and/or the process parameter of the group of yarn spindles;

enabling the yarn spindle quality control apparatus to query an adjustment manner corresponding to the production parameter and/or the process parameter of the group of yarn spindles from a knowledge graph for yarn spindle production and management, comprising:

searching a normal process parameter corresponding to the determined abnormal parameter from the knowledge graph for yarn spindle production and management; and determining, based on the normal process parameter, an adjustment manner for a fault device that corresponds to the determined abnormal parameter; and enabling the yarn spindle quality control apparatus to send the adjustment manner to a related device of the group of yarn spindles, thereby adjusting the fault device of the group of yarn spindles to address the determined abnormal parameter.

17. The storage medium of claim 16, wherein the computer instruction is used to cause the computer to execute:

enabling the yarn spindle quality control apparatus to store the quality inspection result of the group of yarn spindles, the production parameter of the group of yarn spindles and the process parameter of the group of yarn spindles in the knowledge graph for the yarn spindle production and management, in a case where the quality inspection result of the group of yarn spindles is normal.

\* \* \* \* \*